United States Patent
He et al.

(10) Patent No.: US 10,069,338 B2
(45) Date of Patent: Sep. 4, 2018

(54) POWER RECEIVER CONTROL CIRCUIT FOR WIRELESS POWER RECEIVER APPARATUS

(71) Applicant: ROHM CO., LTD., Ukyo-Ku, Kyoto (JP)

(72) Inventors: Xun He, Kyoto (JP); Daisuke Uchimoto, Kyoto (JP); Takeshi Nozawa, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 268 days.

(21) Appl. No.: 15/009,063

(22) Filed: Jan. 28, 2016

(65) Prior Publication Data
US 2016/0241083 A1 Aug. 18, 2016

(30) Foreign Application Priority Data
Feb. 5, 2015 (JP) ................... 2015-021322

(51) Int. Cl.
*H02J 50/10* (2016.01)
*H02J 50/80* (2016.01)
(52) U.S. Cl.
CPC .............. *H02J 50/10* (2016.02); *H02J 50/80* (2016.02)

(58) Field of Classification Search
CPC ...................................................... H02J 50/10
USPC ........................................................ 307/104
See application file for complete search history.

(56) References Cited

U.S. PATENT DOCUMENTS

| 2011/0181119 A1* | 7/2011 | Ishibashi ................. H02J 50/12 307/104 |
| 2015/0340881 A1* | 11/2015 | Nakano ................... H02J 5/005 307/104 |

\* cited by examiner

*Primary Examiner* — Rexford Barnie
*Assistant Examiner* — Joseph Inge
(74) *Attorney, Agent, or Firm* — Cantor Colburn LLP

(57) ABSTRACT

A control circuit is provided for a power receiver apparatus. A target voltage range setting unit sets an upper limit voltage $V_H$ and a lower limit voltage $V_L$ that define a target voltage range REF to be set for a rectified voltage $V_{RECT}$ that develops across a smoothing capacitor. An electric power control unit compares the rectified voltage $V_{RECT}$ with each of the upper limit voltage $V_H$ and the lower limit voltage $V_L$, and generates a power control signal $D_{PC}$ based on the comparison result. A modulator modulates the power control signal $D_{PC}$, and transmits the modulated signal to a wireless power transmitter apparatus via a reception coil. Upon detection of an oscillation state in the rectified voltage $V_{RECT}$, the target voltage range setting unit expands the target voltage range REF.

12 Claims, 7 Drawing Sheets

POWER RECEIVER CONTROL CIRCUIT FOR WIRELESS POWER RECEIVER APPARATUS

CROSS-REFERENCE TO RELATED APPLICATIONS

This application is based upon and claims the benefit of priority from the prior Japanese Patent Application No. 2015-021322, filed Feb. 5, 2015, the entire contents of which are incorporated herein by reference.

BACKGROUND OF THE INVENTION

1. Field of the Invention

The present invention relates to a wireless power supply technique.

2. Description of the Related Art

In recent years, as a power supply method for supplying electric power to an electronic device, a wireless power supply method has been becoming popular. Such a wireless power supply method can be classified into two methods, i.e., the magnetic induction (MI) method and the magnetic resonance (MR) method. At present, as the MI method, (1) the "Qi" standard developed by the WPC (Wireless Power Consortium) and (2) the standard developed by the PMA (Power Matters Alliance) (which will be referred as the "PMA standard" hereafter) have become mainstream.

FIG. 1 is a diagram showing a configuration of a wireless power supply system 100R that conforms to the PMA standard. The wireless power supply system 100R includes a power transmitter (TX) apparatus 200R and a power receiver (RX) apparatus 300R. The power receiver apparatus 300R is mounted on an electronic device such as a cellular phone terminal, a smartphone, an audio player, a game machine, a tablet terminal, etc.

The power transmitter apparatus 200R includes a transmission coil (primary coil) 202, a driver 204, a controller 206, and a demodulator 208. The driver 204 includes an H-bridge circuit (full bridge circuit) or otherwise a half bridge circuit. The driver 204 applies a driving signal S1, and specifically, which is configured as a pulse signal, to the transmission coil 202. In this state, a driving current flows through the transmission coil 202. As a result, the transmission coil 202 generates an electric power signal S2 configured as an electromagnetic field signal. The controller 206 integrally controls the overall operation of the power transmitter apparatus 200R. Specifically, the controller 206 controls the switching frequency of the driver 204, or otherwise the duty ratio of the switching operation thereof, so as to change the transmission power.

The power receiver apparatus 300R includes a reception coil 302, a rectifier circuit 304, a smoothing capacitor 306, a modulator 308, a load 310, a controller 312, and a power supply circuit 314. The reception coil 302 receives the electric power signal S2 from the transmission coil 202. Furthermore, the reception coil 302 transmits a control signal S3 to the transmission coil 202. The rectifier circuit 304 and the smoothing capacitor 306 rectify and smooth a current $I_{RX}$ induced at the reception coil 302 according to the electric power signal S2, thereby converting the current $I_{RX}$ into a DC voltage $V_{RECT}$.

The power supply circuit 314 charges an unshown secondary battery using the electric power supplied from the power transmitter apparatus 200, or otherwise steps up or steps down the DC voltage $V_{RECT}$ and supplies the DC voltage thus stepped up or down to the controller 312 or the load 310 configured as an external circuit.

In the PMA standard, a communication protocol is defined between the power transmitter apparatus 200R and the power receiver apparatus 300R. Such a communication protocol allows the power receiver apparatus 300R to transmit information to the power transmitter apparatus 200R in the form of the control signal S3. The control signal S3 is transmitted from the power reception coil 302 (secondary coil) to the transmission coil 202 in the form of an AM (Amplitude Modulation) signal using backscatter modulation.

The control signal S3 includes a power control signal (which will also be referred to as a "packet") which controls an amount of electric power to be supplied to the power receiver apparatus 300R, and data which indicates the identifying information for the power receiver apparatus 300R. The demodulator 208 demodulates the control signal S3 included in the current or otherwise the voltage applied to the transmission coil 202. The controller 206 controls the driver 204 based on the power control signal included in the control signal S3 thus demodulated.

As a result of investigating the electric power control operation of the wireless power supply system 100R shown in FIG. 1, the present inventors have come to recognize the following problems.

In the PMA standard, the controller 312 of the power receiver apparatus 300R monitors the electric power supplied to the load 310, and generates, based on the monitoring result, a power control signal which indicates an amount of electric power to be supplied from the power transmitter apparatus 200. Specifically, a target value is set for the rectified voltage $V_{RECT}$. Furthermore, an upper limit voltage $V_H$ and a lower limit voltage $V_L$ are set in the vicinity of the target voltage. The controller 312 generates a power control signal $D_{PC}$ such that the rectified voltage $V_{RECT}$ is positioned within a target voltage range REF (between $V_L$ and $V_H$).

The PMA standard allows the power control signal $D_{PC}$ to switch between three states, i.e., (i) a state in which the transmission power is maintained (which will be referred to as the "first state $\phi_A$"), (ii) a state in which the transmission power is increased (which will be referred to as the "second state $\phi_B$"), and (iii) a state in which the transmission power is reduced (which will be referred to as the "second state $\phi_C$"). The power transmitter apparatus 200R changes a transmission frequency $f_{TX}$ according to the power control signal $D_{PC}$ received from the power receiver apparatus 300, so as to control the electric power to be transmitted. Specifically, when the power control signal $D_{PC}$ is set to the first state $\phi_A$, the transmission frequency $f_{TX}$ is maintained so as to maintain the transmission power. When the power control signal $D_{PC}$ is set to the second state $\phi_B$, the transmission frequency $f_{TX}$ is changed by a predetermined width $\Delta f_{UP}$ (e.g., by multiple steps) so as to increase the transmission power. Conversely, when the power control signal $D_{PC}$ is set to the third state $\phi_C$, the transmission frequency $f_{TX}$ is changed by a predetermined width $\Delta f_{DN}$ (e.g., by a single step), so as to reduce the transmission power.

FIGS. 2A and 2B are waveform diagrams each showing the electric power control operation of the power supply system 100R shown in FIG. 1. FIG. 2A shows the control operation in a non-oscillation state of the rectified voltage $V_{RECT}$. At the time point t1, $V_{RECT}$ is lower than $V_L$. Accordingly, in order to increase the electric power to be transmitted, the controller 312 switches the power control signal $D_{PC}$ to the second state $\phi_B$. In response to this, the controller 206 of the power transmitter apparatus 200R changes the transmission frequency $f_{TX}$ by a predetermined width $\Delta f_{UP}$. As a result, the transmission power is increased, thereby increasing the rectified voltage $V_{RECT}$.

When $V_{RECT}$ becomes higher than $V_H$ at the time point t2, in order to reduce the electric power to be transmitted, the controller 312 switches the power control signal $D_{PC}$ to the third state $\phi_C$. In response to this, the controller 206 of the power transmitter apparatus 200R changes the transmission frequency $f_{TX}$ by a predetermined width $\Delta f_{DN}$. As a result, the transmission power is reduced, thereby reducing the rectified voltage $V_{RECT}$. At the subsequent time point t3, the relation $V_{RECT} > V_H$ remains. Accordingly, the power control signal $D_{PC}$ is maintained in the third state $\phi_C$. In this state, the transmission power is further reduced, thereby further reducing the rectified voltage $V_{RECT}$. By repeatedly performing such a control operation, such an arrangement is capable of stabilizing the rectified voltage $V_{RECT}$ in the target voltage range between $V_L$ and $V_H$.

However, with the power supply system 100R shown in FIG. 1, it has been found that, in some cases, depending on the position relation between the transmission coil and the reception coil, the temperature, and the like, the rectified voltage $V_{RECT}$ cannot be stabilized within the target voltage range between $V_L$ and $V_H$, i.e., falls into an oscillation state. Such an oscillation state occurs due to the fact that the relation between the variation $\Delta f_{UP}$ (or $\Delta f_{DN}$) of the transmission frequency $f_{TX}$ and the variation in the rectified voltage $V_{RECT}$ is not constant, i.e., this relation changes according to the situation. Description will be made regarding the oscillation state with reference to FIG. 2B.

At the time point t1, $V_{RECT}$ is lower than $V_L$. Accordingly, the power control signal $D_{PC}$ is switched to the second state $\phi_B$. In response to this, the power transmitter apparatus 200R changes the transmission frequency $f_{TX}$ by $\Delta f_{UP}$ so as to raise the electric power to be transmitted. This increases the rectified voltage $V_{RECT}$ by $\delta V_{UP1}$.

When $V_{RECT}$ becomes higher than $V_H$ at the time point t2, in order to reduce the electric power to be transmitted, the controller 312 switches the power control signal $D_{PC}$ to the third state $\phi_C$. In response to this, the power transmitter apparatus 200R changes the transmission frequency $f_{TX}$ by $\Delta f_{DN}$ so as to reduce the electric power to be transmitted. This reduces the rectified voltage $V_{RECT}$ by $\delta V_{DN2}$. At the time point t3, the relation $V_{RECT} > V_H$ remains. Accordingly, the power control signal $D_{PC}$ is maintained in the third state $\phi_C$. In this state, the transmission frequency $f_{TX}$ is further changed by $\Delta f_{DN}$, thereby further reducing the rectified voltage $V_{RECT}$ by $\delta V_{DN3}$.

At the time point t4, the relation $V_{RECT} > V_H$ remains. In this state, the power control signal $D_{PC}$ is maintained in the third state $\phi_C$. Accordingly, the transmission frequency $f_{TX}$ is further changed by $\Delta f_{DN}$, thereby further reducing the rectified voltage $V_{RECT}$ by $\delta V_{DN4}$. With ($V_H - V_L$) as $\Delta V$, when $\delta V_{DN4}$ is greater than $\Delta V$, the rectified voltage $V_{RECT}$ cannot be stabilized within the target voltage range between $V_L$ and $V_H$. Specifically, the rectified voltage $V_{RECT}$ becomes lower than the lower limit voltage $V_L$. Such operations repeatedly occur, which leads to the rectified voltage $V_{RECT}$ falling into the oscillation state. Such oscillation is undesirable from the viewpoint of system stability. In addition, such oscillation leads to an increase in heat generation, resulting in a problem of degraded power transmission efficiency.

Such an oscillation problem is not restricted to the PMA standard. Also, such an oscillation problem can occur with other standards which will be developed in the future for providing the same electric power control operation.

SUMMARY OF THE INVENTION

The present invention has been made in order to solve such a problem. Accordingly, it is an exemplary purpose of an embodiment of the present invention to provide a wireless power receiver apparatus which is capable of suppressing oscillation.

An embodiment of the present invention relates to a control circuit for a wireless power receiver apparatus. The wireless power receiver apparatus comprises: a reception coil; a rectifier circuit that rectifies a current that flows through the reception coil; and a smoothing capacitor connected to an output of the rectifier circuit. The control circuit comprises: a target voltage range setting unit that sets an upper limit voltage and a lower limit voltage that define a target voltage range to be set for a rectified voltage that develops across the smoothing capacitor; an electric power control unit that generates a power control signal for controlling transmission power from the wireless power transmitter apparatus, based on a comparison result obtained by comparing the rectified voltage with each of the upper limit voltage and the lower limit voltage; and a modulator that generates a modulated signal by using the power control signal, and that transmits the modulated signal to the wireless power transmitter apparatus via the reception coil. When an oscillation state is detected in the rectified voltage, the target voltage range setting unit changes the target voltage range.

With such an embodiment, in a state in which oscillation does not occur, the rectified voltage can be stabilized within a narrow target voltage range, thereby providing a high-efficiency operation. On the other hand, when such oscillation has occurred or there is a high probability that such oscillation will occur, the target voltage range is changed so as to suppress the occurrence of such oscillation.

It should be noted that, in the present specification, "detection of an oscillation state" also includes detection of a sign which indicates that such oscillation will occur, in addition to detection of a state in which such oscillation has actually occurred.

Also, when the rectified voltage transits from a stable state in which the rectified voltage is stabilized within the target voltage range to an unstable state in which the rectified voltage deviates from the target voltage range, the target voltage range setting unit may initialize the target voltage range.

Also, the power control signal may be switchable between a first state indicative of maintaining the transmission power, a second state indicative of increasing the transmission power, and a third state indicative of decreasing the transmission power. Also, when the rectified voltage becomes lower than the lower limit voltage as a result of the power control signal being set to the third state, the target voltage range setting unit may judge that the rectified voltage is in the oscillation state.

In a step in which the transmission power is reduced in a stepwise manner according to the power control signal, when the rectified voltage drops beyond the target voltage range, there is a high probability that the rectified voltage has fallen into such an oscillation state. Thus, such an embodiment is capable of appropriately detecting such an oscillation state.

Also, when a state in which the rectified voltage deviates from the target voltage range continues for a predetermined time period, the target voltage range setting unit may judge that the rectified voltage is in the oscillation state.

In the oscillation state, the rectified voltage changes so as to straddle the target voltage range. Accordingly, the rectified voltage remains in a state in which it deviates from the target voltage range. Thus, using this method, such an arrangement is capable of appropriately detecting such an oscillation state.

When the power control signal repeatedly changes for a predetermined time period, the target voltage range setting unit may judge that the rectified voltage is in the oscillation state.

In the oscillation state, the power control signal does not remain at a constant value, i.e., it repeatedly changes. Using this method, such an arrangement is also capable of appropriately detecting such an oscillation state.

Also, the power control signal may be switchable between a first state indicative of maintaining the transmission power, a second state indicative of increasing the transmission power, and a third state indicative of decreasing the transmission power. Also, when the power control signal remains in the first state for a predetermined time period, the target voltage range setting unit may judge that the rectified voltage is in the stable state.

Also, upon detection of the oscillation state in the rectified voltage, the target voltage range setting unit may expand the target voltage range.

As the target voltage range becomes wider, there is a higher probability that the rectified voltage can be stabilized within the target voltage range.

Also, the target voltage range setting unit may expand the target voltage range by reducing the lower limit voltage.

With a platform in which the rectified voltage is stabilized by means of a linear regulator, and the rectified voltage thus stabilized is supplied to a load, by reducing the lower limit voltage, such an arrangement is capable of suppressing the occurrence of such oscillation while suppressing degradation in the efficiency of the linear regulator. Furthermore, such an arrangement is capable of suppressing heat generation.

Also, the target voltage range setting unit may expand the target voltage range by raising the upper limit voltage.

With a platform in which the rectified voltage is stabilized by means of a switching regulator, and the rectified voltage thus stabilized is supplied to a load, an increase in the upper limit voltage leads to only a small reduction in the efficiency of the switching regulator. Thus, such an arrangement is capable of suppressing the occurrence of such oscillation while suppressing degradation of the efficiency. Also, in a case of employing a platform in which the load configured as a downstream stage cannot operate if the rectified voltage drops, by raising the upper limit voltage, such an arrangement allows the load configured as a downstream stage to operate in a sure manner.

Also, upon detection of the oscillation state in the rectified voltage, the target voltage range setting unit may shift the target voltage range.

By shifting the target voltage range such that the rectified voltage can be stabilized to a given voltage level, such an arrangement is capable of suppressing the occurrence of such oscillation.

Also, the control circuit may conform to the PMA standard.

Also, the control circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the circuit as a single IC, such an arrangement allows the circuit area to be reduced, and allows the circuit elements to have uniform characteristics.

Another embodiment of the present invention relates to a wireless power receiver apparatus or otherwise an electronic device. The wireless power receiver apparatus or the electronic device may comprise: a reception coil; a rectifier circuit that rectifies a current that flows through the reception coil; and any one of the aforementioned control circuits.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 3:
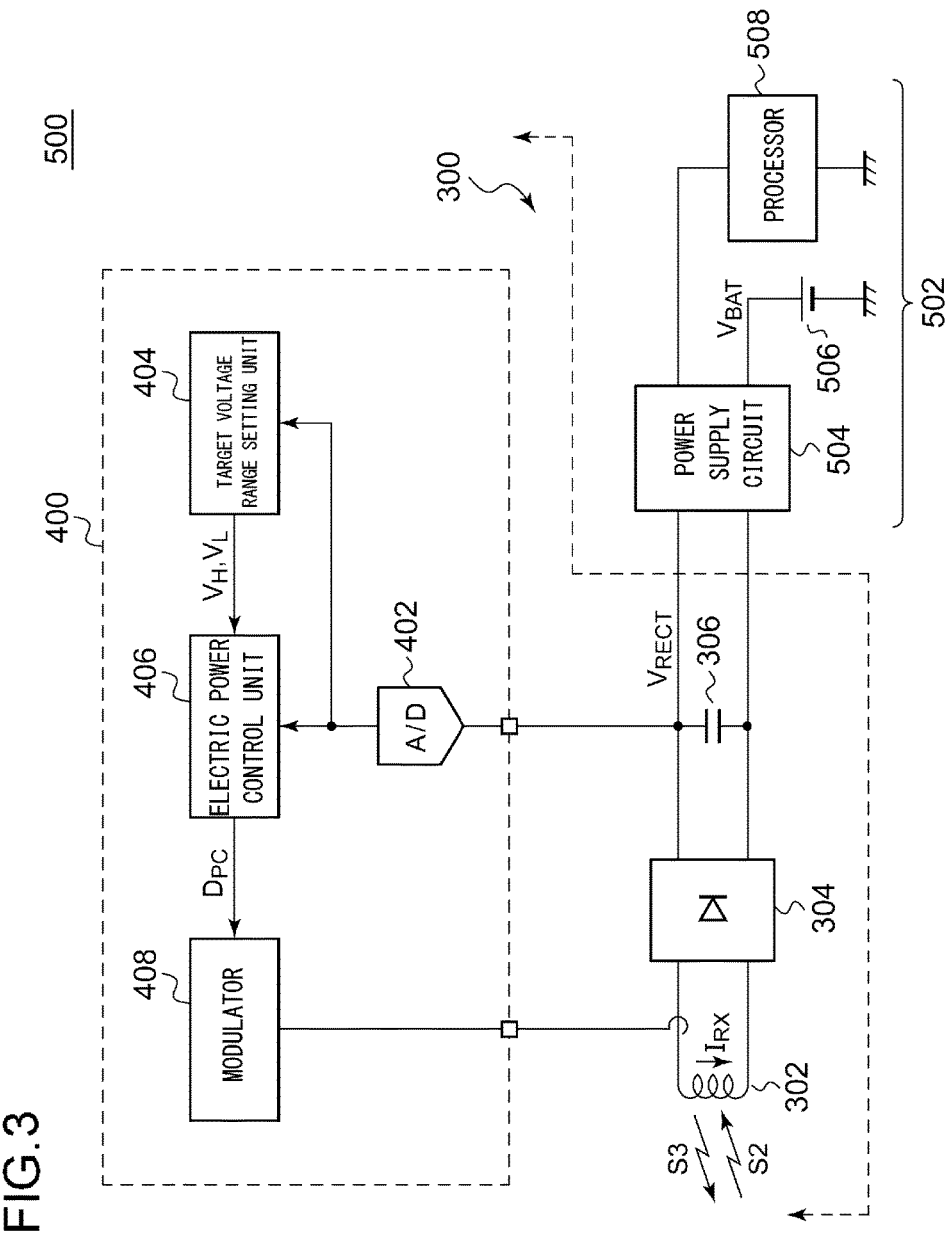
FIG. 3 is a block diagram showing an electronic device including a power receiver apparatus according to an embodiment.

FIG. 3 is a block diagram showing an electronic device 500 including a power receiver apparatus 300 according to an embodiment. The power receiver apparatus 300 receives an electric power signal S2 from an unshown power transmitter apparatus, stores the electric power signal S2 thus received in a smoothing capacitor 306 in the form of energy, and supplies the electric power to a load 502.

Figure 1:
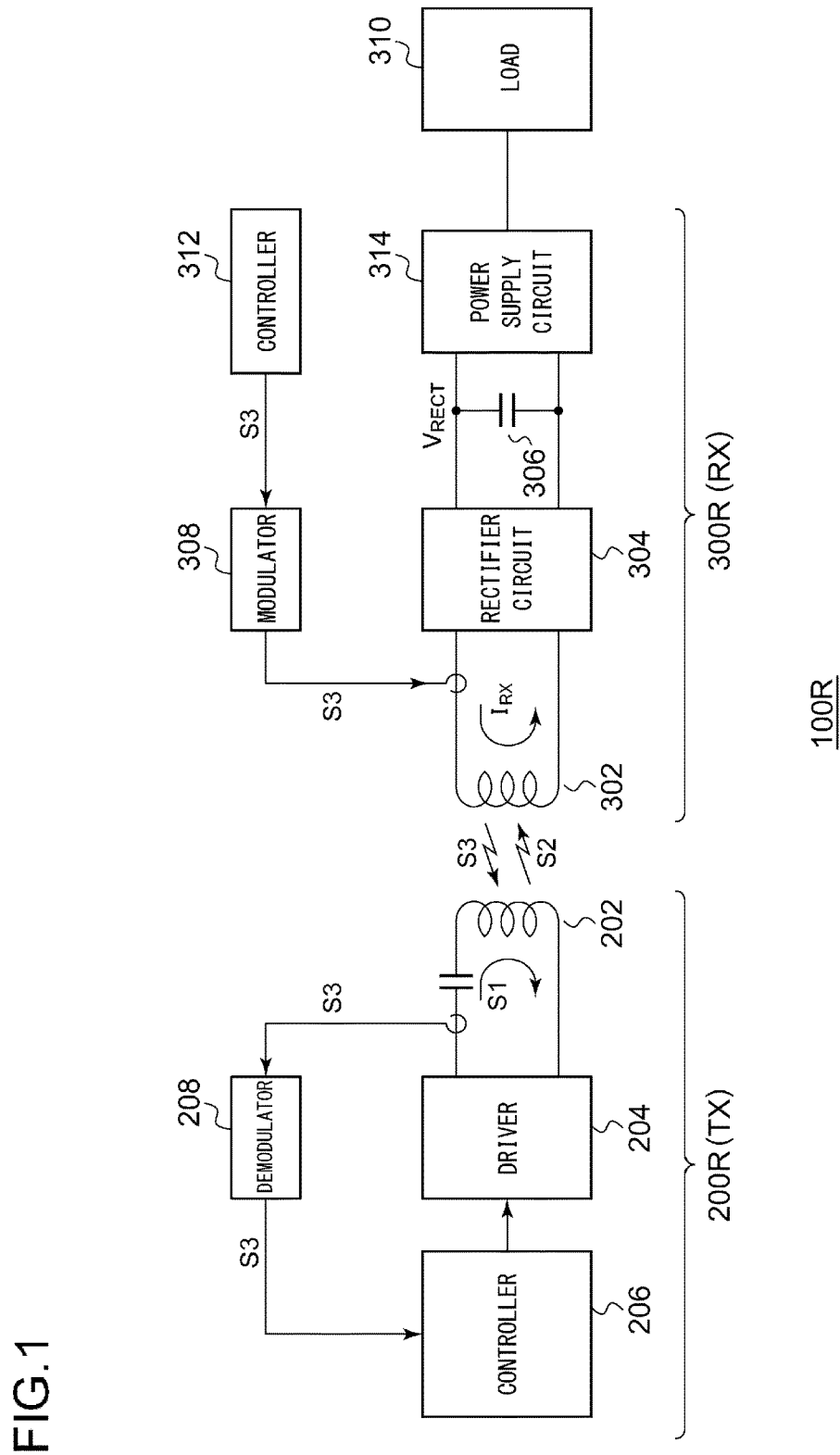
FIG. 1 is a diagram showing a configuration of a wireless power supply system that conforms to the PMA standard.

The power receiver apparatus 300 includes a reception coil 302, a rectifier circuit 304, a smoothing capacitor 306, and a control circuit 400. The power receiver apparatus 300 shown in FIG. 3 conforms to the PMA standard, and is applicable to the power supply system 100R shown in FIG. 1.

The reception coil 302 receives the electric power signal S2 from the transmission coil 202. Furthermore, the reception coil 302 transmits a control signal S3 to the transmission coil 202. A current $I_{RX}$ induced according to the electric power signal S2 flows through the reception coil 302. The input side of the rectifier circuit 304 is connected to the reception coil 302. The rectifier circuit 304 full-wave rectifies or otherwise half-wave rectifies the current $I_{RX}$. The rectifier circuit 304 may be configured as a diode bridge circuit or an H-bridge circuit. The smoothing capacitor 306 is connected to the output of the rectifier circuit 102, so as to smooth the output voltage of the rectifier circuit 102. The DC voltage (which will be referred to as the "rectified voltage") $V_{RECT}$ thus generated by the smoothing capacitor 306 is supplied to the load 502 configured as a subsequent stage.

The load 502 includes a power supply circuit 504, a secondary battery 506, and various kinds of circuits such as a processor 508.

It is difficult to directly drive an electric circuit such as the processor 508 or the like using the rectified voltage $V_{RECT}$. Accordingly, the power supply circuit 504 is provided. The power supply circuit 504 includes a linear regulator and/or a switching regulator (DC/DC converter). The power supply circuit 504 regulates the rectified voltage $V_{RECT}$ to a suitable voltage level, and supplies the voltage thus regulated to the processor 508. Also, the power supply circuit 504 may include a charger circuit that charges the secondary battery 506 using the electric power supplied from the power transmitter apparatus 200.

Next, description will be made regarding the control circuit 400 according to the embodiment. The control circuit 400 includes a voltage measurement unit 402, a target voltage range setting unit 404, an electric power control unit 406, and a modulator 408. The control circuit 400 is configured as a function IC (Integrated Circuit) monolithically integrated on a single semiconductor substrate. It should be noted that a part of the rectifier circuit 304 may be integrated on the control circuit 400.

The voltage measurement unit 402 measures the rectified voltage $V_{RECT}$ that develops at the smoothing capacitor 306 or otherwise a voltage that corresponds to the rectified voltage $V_{RECT}$. The voltage measurement unit 402 may be configured as an A/D converter that generates a digital value $D_{RECT}$ which represents the measurement value of the rectified voltage $V_{RECT}$.

The target voltage range setting unit 404 sets the upper limit voltage $V_H$ and the lower limit voltage $V_L$ that define the target voltage range REF for the rectified voltage $V_{RECT}$ that develops at the smoothing capacitor 306. Specifically, the target voltage range setting unit 404 outputs digital values $D_H$ and $D_L$ that represent the setting values of the upper limit voltage $V_H$ and the lower limit voltage $V_L$. In the present embodiment, the target voltage range REF is variable. Accordingly, at least one from among the upper limit voltage $V_H$ and the lower limit voltage $V_L$ is variable.

The electric power control unit 406 compares the rectified voltage $V_{RECT}$ with each of the upper limit voltage $V_H$ and the lower limit voltage $V_L$, and generates a power control signal $D_{PC}$ based on the comparison result. The PMA standard allows the power control signal $D_{PC}$ to switch between three states, i.e., (i) a state indicative of maintaining the transmission power (which will be referred to as the "first state $\phi_A$"), (ii) a state indicative of increasing the transmission power (which will be referred to as the "second state $\phi_B$"), and (iii) a state indicative of decreasing the transmission power (which will be referred to as the "third state $\phi_C$"). The power transmitter apparatus 200 changes a transmission frequency $f_{TX}$ according to the power control signal $D_{PC}$ received from the power receiver apparatus 300, so as to control the electric power to be transmitted. Specifically, when the power control signal $D_{PC}$ is set to the first state $\phi_A$, the transmission frequency $f_{TX}$ is maintained, thereby maintaining the transmission power. When the power control signal $D_{PC}$ is set to the second state $\phi_B$, the transmission frequency $f_{TX}$ is changed by a predetermined width (e.g., by multiple steps), so as to increase the transmission power. Conversely, when the power control signal $D_{PC}$ is set to the third state $\phi_C$, the transmission frequency $f_{TX}$ is changed by a predetermined width $\Delta f_{DN}$ (e.g., by a single step), so as to reduce the transmission power.

The modulator 408 modulates the power control signal $D_{PC}$ so as to generate a modulated signal, superimposes the modulated signal on the current $I_{RX}$ through the reception coil 302 so as to generate a control signal S3, and transmits the control signal S3 to the wireless power transmitter apparatus.

When an oscillation state $\phi1$ is detected in the rectified voltage $V_{RECT}$, the target voltage range setting unit 404 raises the upper limit voltage $V_H$ and/or reduces the lower limit voltage $V_L$, so as to change the target voltage range REF. Specifically, in the present embodiment, when the oscillation state $\phi1$ is detected in the rectified voltage $V_{RECT}$, the target voltage range REF is expanded.

Furthermore, when the rectified voltage $V_{RECT}$ transits from a stable state $\phi2$, in which the rectified voltage $V_{RECT}$ is stabilized within the target voltage range REF, to an unstable state $\phi3$, in which the rectified voltage $V_{RECT}$ deviates from the target voltage range REF, the target voltage range setting unit 404 initializes the target voltage range REF. Specifically, in this case, the upper limit voltage $V_H$ and the lower limit voltage $V_L$ are reset to their initial values $V_{H0}$ and $V_{L0}$, respectively. The unstable state $\phi3$ includes the oscillation state $\phi1$.

Figure 4B:
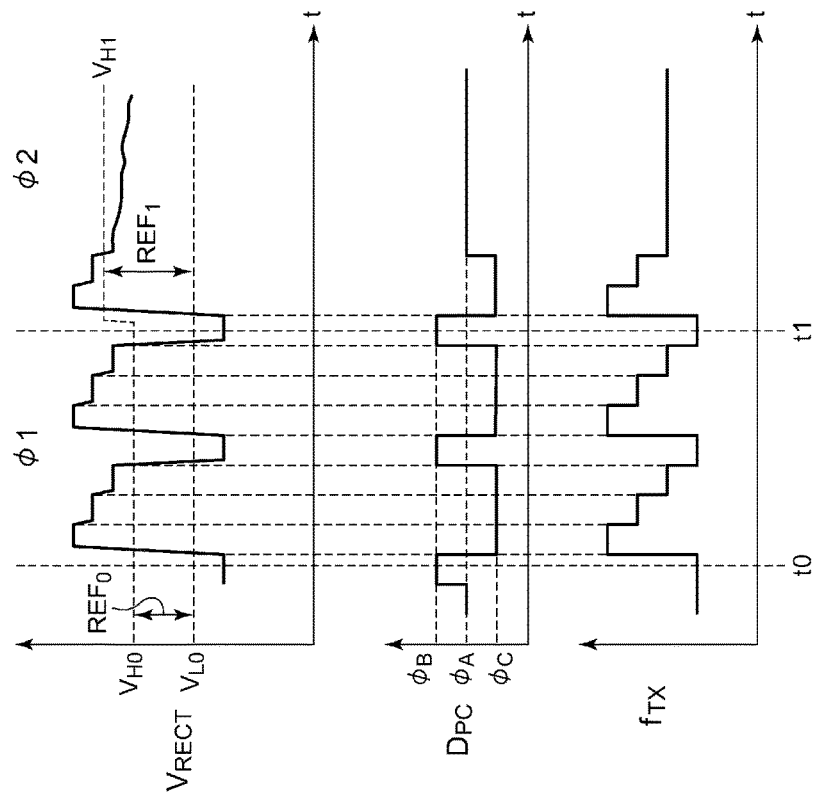
FIGS. 4A and 4B are operation waveform diagrams each showing the operation of the power receiver apparatus shown in FIG. 3.
Figure 4A:
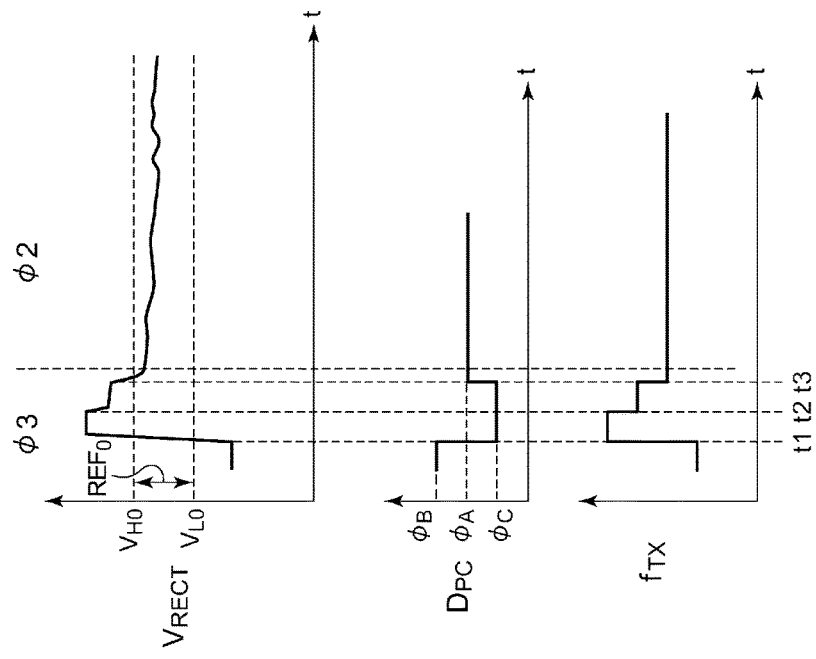

The above is the configuration of the power receiver apparatus 300. Next, description will be made regarding the operation thereof. FIGS. 4A and 4B are operation waveform diagrams each showing the operation of the power receiver apparatus 300 shown in FIG. 3.

Figure 2A:
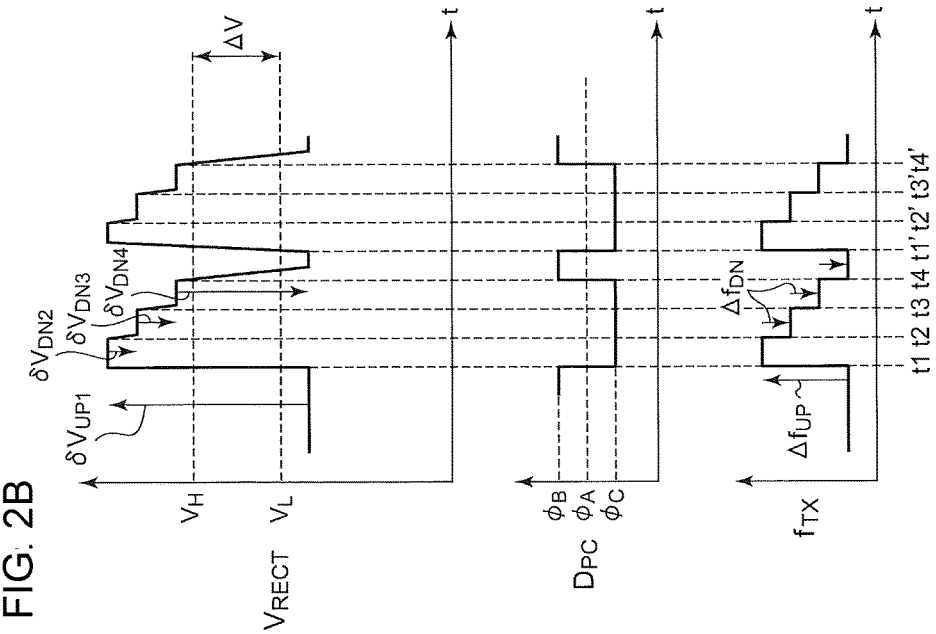
FIGS. 2A and 2B are waveform diagrams each showing an electric power control operation of the power supply system shown in FIG. 1.
Figure 2B:
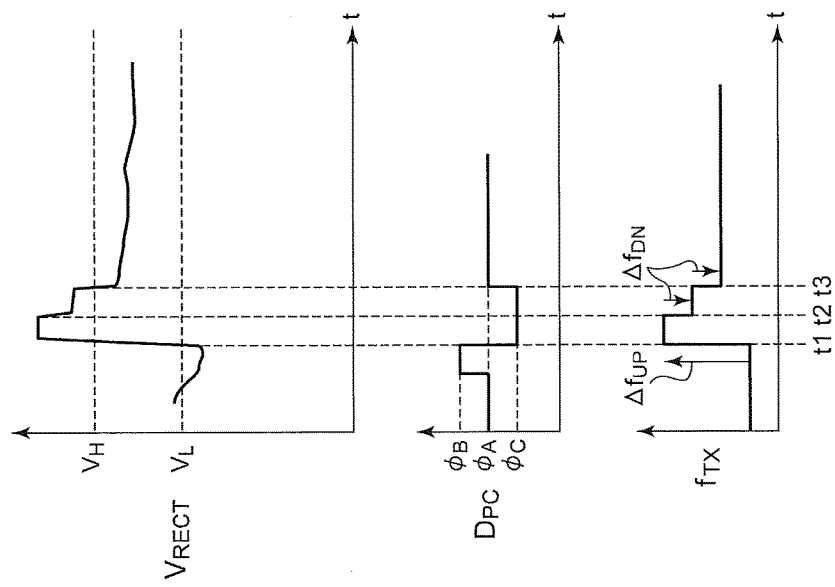

FIG. 4A shows the control operation in a non-oscillation state. The operation waveform shown in FIG. 4A is the same as that shown in FIG. 2A. The target voltage range REF is set to an initial state range $REF_0$ configured as the narrowest range. The power control signal $D_{PC}$ is controlled according to the comparison result obtained by comparing the rectified voltage $V_{RECT}$ with each of the upper limit voltage $V_{H0}$ and the lower limit voltage $V_{L0}$. Thus, the transmission power is controlled, thereby stabilizing the rectified voltage $V_{RECT}$ within the target voltage range $REF_0$.

FIG. 4B shows the control operation in the oscillation state. In a time period between t0 and t1, the rectified voltage $V_{RECT}$ cannot be stabilized within the initial target voltage range $REF_0$, and the rectified voltage $V_{RECT}$ enters the oscillation state ϕ1. When the oscillation state ϕ1 is detected, the target voltage range setting unit 404 of the control circuit 400 expands the target voltage range REF. In the present embodiment, in the oscillation state ϕ1, the target voltage range setting unit 404 raises the upper limit voltage $V_{H0}$ to the voltage level $V_{H1}$ that is higher than the voltage level $V_{H0}$ by one step. Thus, in this case, the target voltage range REF is expanded to a target voltage range $REF_1$.

As a result of expanding the target voltage range REF to $REF_0$, in the step in which the transmission frequency $f_{TX}$ is reduced according to the power control signal $D_{PC}$ so as to reduce the transmission power in a stepwise manner, the rectified voltage $V_{RECT}$ is controlled so as to be within the target voltage range $REF_1$. Thus, the rectified voltage $V_{RECT}$ is restored from the oscillation state ϕ1 to the stable state ϕ2.

With the power receiver apparatus 300 according to the embodiment as described above, in a state in which such oscillation does not occur as shown in FIG. 4A, such an arrangement is capable of stabilizing the rectified voltage $V_{RECT}$ within the narrow target voltage range $REF_0$. As a result, such an arrangement provides a high-efficiency operation. In a case in which such oscillation has occurred as shown in FIG. 4B, or otherwise in a case in which there is a high probability that such oscillation will occur, the target voltage range REF is expanded, thereby suppressing the occurrence of oscillation.

As another approach for suppressing the occurrence of oscillation, the present inventors have investigated a technique (which will also be referred to as the "comparison technique") in which the target voltage range $REF_0$ is configured to have a width ΔV that is greater than the maximum value of a possible voltage reduction $\delta V_{DN}$. With such a comparison technique, such an arrangement ensures that the rectified voltage $V_{RECT}$ is positioned in the target voltage range between $V_L$ and $V_H$ in the step in which the transmission power is reduced in a stepwise manner according to the power control signal $D_{PC}$. Thus, such an arrangement prevents the rectified voltage $V_{RECT}$ from falling into an oscillation state.

With such a comparison technique, in order to provide the target voltage range $REF_0$ having a large width ΔV, there is a need to raise the upper limit voltage $V_H$ and/or to lower the lower limit voltage $V_L$. In a case in which the upper limit voltage $V_H$ is set to an excessively high voltage, an arrangement in which the power supply circuit 314 is configured as a linear regulator has another problem. That is to say, in some cases, the rectified voltage $V_{RECT}$ is stabilized at a high voltage. This leads to large loss in the linear regulator, which is a problem. On the other hand, in a case in which the lower limit voltage $V_L$ is set to an excessively low voltage, in some cases, the rectified voltage $V_{RECT}$ becomes lower than the minimum level that is required to drive the load arranged as a downstream stage, leading to a problem in that the load cannot be driven.

With the power receiver apparatus 300 according to the embodiment, the target voltage range REF is dynamically controlled instead of employing the target voltage range REF having a fixed width. Thus, such an arrangement is capable of suppressing to a minimum the problem that can occur in the comparison technique.

Figure 5A:
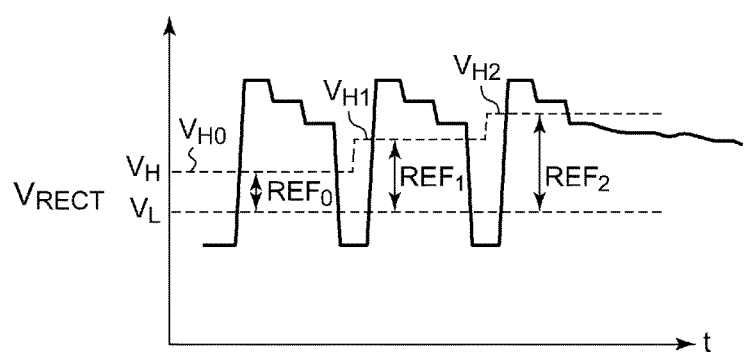
FIGS. 5A and 5B are operation waveform diagrams each showing another example of the operation of the power receiver apparatus shown in FIG. 3.
Figure 5B:
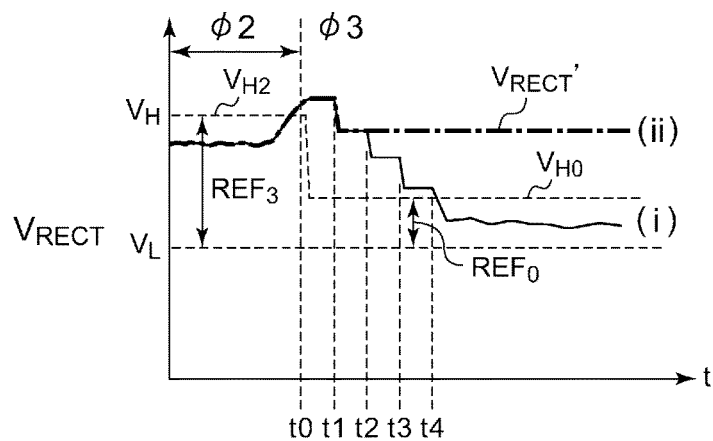

FIGS. 5A and 5B are operation waveform diagrams each showing a different example of the operation of the power receiver apparatus 300 shown in FIG. 3.

FIG. 4B shows an example in which, as a result of expanding the target voltage range REF by one step, such an arrangement is capable of resolving such an oscillation problem. However, depending on the situation, it is conceivable that a one-step expansion only would be insufficient to resolve such a problem of the occurrence of the oscillation state ϕ1. In order to solve such a problem, preferably, the target voltage range setting unit 404 repeatedly expands the target voltage range REF from $REF_0$ to $REF_1$, $REF_2$, and so forth, until such a problem of the occurrence of the oscillation state ϕ1 is resolved. Specifically, the target voltage range setting unit 404 raises the upper limit voltage $V_H$ in a stepwise manner from $V_{H0}$ to $V_{H1}$, $V_{H2}$, . . . , $V_{HN}$, so as to expand the target voltage range REF. Here, $V_{HN}$ represents the maximum value of the upper limit voltage $V_H$.

After the target voltage range REF is expanded once, in a case in which the expanded target voltage range REF is repeatedly used without change, such an arrangement can have a problem of degraded efficiency, or can have a problem of an increase in heat generation. In order to solve such a problem, as described above, when the state transits from the stable state ϕ2 to the unstable state ϕ3, the target voltage range setting unit 404 resets the target voltage range REF to the initial state $REF_0$. FIG. 5B shows an example in which the target voltage range REF is reset.

Before the time point t0, the stable state ϕ2 is maintained using the expanded target voltage range $REF_3$. When the rectified voltage $V_{RECT}$ deviates from the target voltage range $REF_3$ and the state transits to the unstable state ϕ3, the upper limit voltage $V_H$ is reset to the initial value $V_{H0}$, and accordingly, the target voltage range REF is reset to $REF_0$.

At the time point t1, the rectified voltage $V_{RECT}$ is higher than the upper limit voltage $V_{H0}$. Accordingly, the power control signal $D_{PC}$ is reduced, thereby reducing the rectified voltage $V_{RECT}$. The power control signal $D_{PC}$ is reduced at every time point t2, t3, and t4. As a result, the rectified voltage $V_{RECT}$ is eventually stabilized within the target voltage range $REF_0$. Such a control operation is represented by the solid line (i).

In FIG. 5B, the line of alternately long and short dashes (ii) represents a waveform of the control operation in a case in which the target voltage range REF is not reset. It can be understood that, in a case in which the target voltage range $REF_3$ is maintained, the rectified voltage $V_{RECT}'$ is set to a relatively high voltage level. Such an arrangement leads to an increase in loss in the power supply circuit 504 configured as a downstream stage, resulting in degraded efficiency. In contrast, with the power receiver apparatus 300 according to the embodiment, such an arrangement is capable of resetting the target voltage range REF. Such an arrangement provides an operation with the rectified voltage $V_{RECT}$ having a low voltage level, thereby providing improved efficiency.

Figure 6:
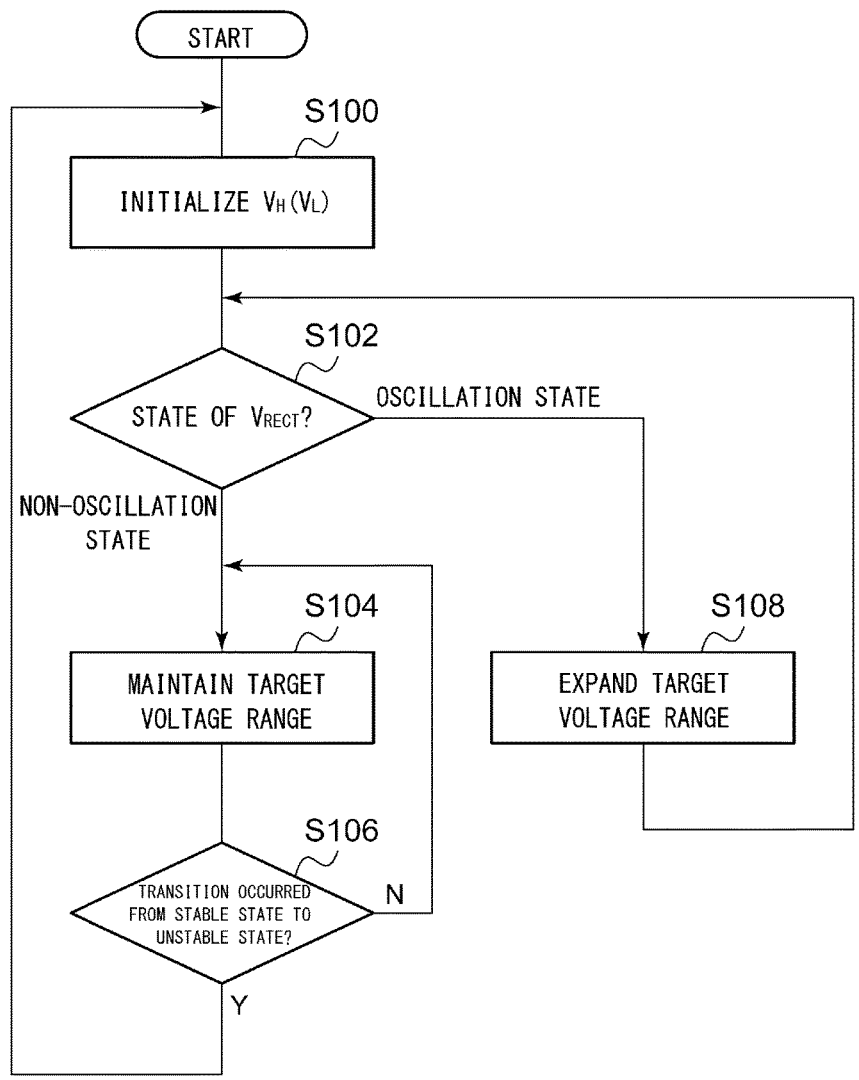
FIG. 6 is a flowchart showing the control operation of a target voltage range setting unit.

FIG. 6 is a flowchart showing the control operation of the target voltage range setting unit 404.

First, the upper limit voltage $V_H$ is initialized to $V_{H0}$, thereby setting the target voltage range to $REF_0$ (S100). In a case in which the lower limit voltage $V_L$ is configured as a variable voltage, the lower limit voltage $V_L$ is initialized to $V_{L0}$.

The target voltage range setting unit 404 judges the state of the rectified voltage $V_{RECT}$ (S102). In a non-oscillation state of the rectified voltage $V_{RECT}$, the target voltage range REF is maintained (S104). Upon detection of a transition from the stable state ϕ2 to the unstable state ϕ3 (YES in S106), the target voltage range REF is initialized (S100). During a period in which the stable state ϕ2 continues (NO in S106), the target voltage range REF is maintained (S104).

Based on the judgment result with respect to the state of the rectified voltage $V_{RECT}$ (in S102), when judgment is made that the rectified voltage $V_{RECT}$ is in the oscillation state, the target voltage range REF is expanded (S104). Subsequently, judgment is made again regarding whether the state of the rectified voltage $V_{RECT}$ is the oscillation state or the non-oscillation state (S102). With such an operation loop, the target voltage range REF is expanded until such an oscillation problem is resolved.

Next, description will be made regarding a judgment method for judging whether or not the rectified voltage $V_{RECT}$ is in the oscillation state.

[First Method]

In the control operation in which the transmission frequency $f_{TX}$ is changed according to the power control signal $D_{PC}$ so as to reduce the transmission power in a stepwise manner, when the rectified voltage $V_{RECT}$ drops beyond the target voltage range REF, the rectified voltage $V_{RECT}$ has fallen into the oscillation state, or otherwise there is a high probability that it will fall into the oscillation state. Accordingly, when the rectified voltage $V_{RECT}$ becomes lower than the lower limit voltage $V_L$ after the power control signal $D_{PC}$ is set to the third state $\phi_C$ so as to reduce the transmission power, the target voltage range setting unit 404 judges that there is a sign of the oscillation state ϕ1 in the rectified voltage $V_{RECT}$, and the target voltage range setting unit 404 changes the target voltage range REF.

Alternatively, when such a state continues throughout multiple cycles, the target voltage range setting unit 404 may judge that the rectified voltage $V_{RECT}$ is in the oscillation state ϕ1, and may change the target voltage range REF.

[Second Method]

In the oscillation state ϕ1, the rectified voltage $V_{RECT}$ changes so as to straddle the target voltage range REF. Accordingly, deviation of the rectified voltage $V_{RECT}$ from the target voltage range REF continues. Using this mechanism, when such deviation of the rectified voltage $V_{RECT}$ from the target voltage range REF continues for a predetermined time period, i.e., when the rectified voltage $V_{RECT}$ has not been positioned within the target voltage range REF in the predetermined time period, judgment is made that the rectified voltage $V_{RECT}$ is in the oscillation state ϕ1.

[Third Method]

In the oscillation state ϕ3, the power control signal $D_{PC}$ repeatedly changes without being set to the first state $\phi_A$. Using this mechanism, when the power control signal DCP repeatedly changes for a predetermined time period, the target voltage range setting unit 404 may judge that the rectified voltage $V_{RECT}$ is in the oscillation state ϕ1. In other words, when the power control signal $D_{PC}$ remains in the first state $\phi_A$ for a predetermined judgment time period, the target voltage range setting unit 404 may judge that the rectified voltage $V_{RECT}$ is in the non-oscillation state.

[Usage]

Figure 7:
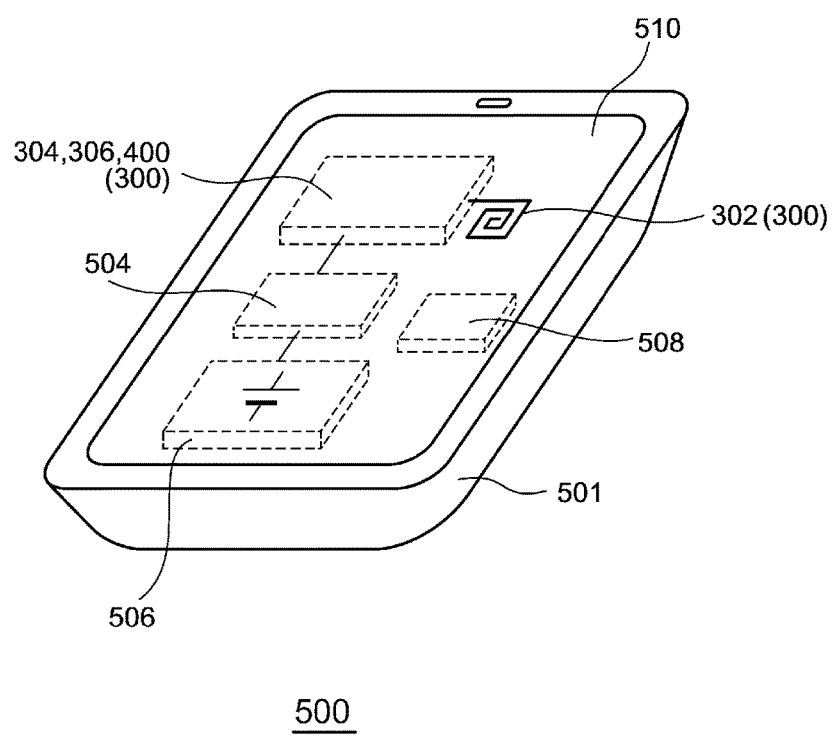
FIG. 7 is a diagram showing an electronic device including the power receiver apparatus according to the embodiment.

Lastly, description will be made regarding an example of an electronic device employing the wireless power receiver apparatus 300 according to the embodiment. FIG. 7 is a diagram showing an electronic device 500 including the power receiver apparatus 300 according to the embodiment.

The electronic device 500 shown in FIG. 7 is configured as a smartphone, a tablet PC, a portable game machine, or a portable audio player. A housing 501 includes, as built-in components, a power supply circuit 504, a secondary battery 506, a processor 508, a display apparatus 510, and the aforementioned power receiver apparatus 300. The processor 508 may include a wireless (RF) unit, a baseband processor, an application processor, an audio processor, and the like.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[Modification 1]

Description has been made in the embodiment regarding an arrangement in which the upper limit voltage $V_H$ is raised in a stepwise manner such that it is sequentially set to $V_{H0}$, $V_{H1}$, $V_{H2}$, . . . , $V_{HN}$ (it should be noted that $V_{H0} < V_{H1} < V_{H2} . . . < V_{HN}$), so as to expand the target voltage range REF. However, the present invention is not restricted to such an arrangement. For example, the lower limit voltage $V_L$ may be reduced in a stepwise manner such that it is sequentially set to $V_{L0}$, $V_{L1}$, $V_{L2}$, . . . , $V_{LN}$ (it should be noted that $V_{L0} > V_{L1} > V_{L2} . . . > V_{LN}$), so as to expand the target voltage range REF.

In a case of employing a platform including the power supply circuit 504 configured as a linear regulator, and in a case in which the upper limit voltage $V_H$ is raised, this leads to degraded efficiency, resulting in increased heat generation, which is undesirable. In a case of employing such a platform, by reducing the lower limit voltage $V_L$, such an arrangement is capable of suppressing the occurrence of oscillation while maintaining high efficiency.

[Modification 2]

Also, both the upper limit voltage $V_H$ and the lower limit voltage $V_L$ may be changed. In this case, first, the lower limit voltage $V_L$ may be reduced in a state in which the upper limit voltage $V_H$ is fixed to the initial value $V_{H0}$. When the lower limit voltage $V_L$ reaches the minimum value $V_{LN}$, the upper limit voltage $V_H$ may be raised. Also, as an another approach, first, the upper limit voltage $V_H$ may be raised in a state in which the lower limit voltage $V_L$ is fixed to the initial value $V_{L0}$. When the upper limit voltage $V_H$ reaches the maximum value $V_{HN}$, the lower limit voltage $V_L$ may be reduced. Also, the upper limit voltage $V_H$ and the lower limit voltage $V_L$ may be alternately changed. Also, the upper limit voltage $V_H$ and the lower limit voltage $V_L$ may be changed at the same time in increments of one step.

[Modification 3]

Description has been made in the embodiment regarding an arrangement in which the present invention is applied to the PMA standard. However, the present invention is not restricted to such an arrangement. Also, the present invention is applicable to other standards which will be developed in the future for providing a similar electric power control operation.

For example, description has been made in the embodiment regarding an arrangement in which the power control signal $D_{PC}$ is switchable between three states. However, the present invention is not restricted to such an arrangement.

For example, the power control signal $D_{PC}$ may be configured as multivalued data which indicates the transmission power or the transmission frequency. In this case, when the rectified voltage $V_{RECT}$ becomes higher than the upper limit voltage $V_H$, the electric power control unit 406 changes the power control signal $D_{PC}$ in the first direction. Conversely, when the rectified voltage $V_{RECT}$ becomes lower than the lower limit voltage $V_L$, the electric power control unit 406 changes the power control signal $D_{PC}$ in the second direction. For example, the first direction represents the direction in which the power control signal $D_{PC}$ is increased. Conversely, the second direction represents the direction in which the power control signal $D_{PC}$ is reduced. When the rectified voltage $V_{RECT}$ becomes higher than the upper limit voltage $V_H$, the electric power control unit 406 reduces the power control signal $D_{PC}$ by one step. When the rectified voltage $V_{RECT}$ becomes lower than the lower limit voltage $V_L$, the electric power control unit 406 increases the power control signal $D_{PC}$ by multiple steps. The power transmitter apparatus 200 transmits electric power to the power receiver apparatus 300 according to the power control signal $D_{PC}$.

In this modification, when the rectified voltage $V_{RECT}$ becomes lower than the lower limit voltage $V_L$ as a result of changing the power control signal in the first direction, the target voltage range setting unit 404 may judge that the rectified voltage $V_{RECT}$ is in the oscillation state.

In the step in which the power control signal $D_{PC}$ is changed so as to reduce the transmission power in a stepwise manner, when the rectified voltage $V_{RECT}$ drops beyond the target voltage range REF, there is a high probability that it has fallen into the oscillation state. Thus, such an embodiment is capable of appropriately detecting such an oscillation state.

Also, when the power control signal $D_{PC}$ repeatedly changes for a predetermined time period, the target voltage range setting unit 404 may judge that the rectified voltage $V_{RECT}$ is in the oscillation state.

In the oscillation state, the power control signal $D_{PC}$ does not remain at a constant value, i.e., it repeatedly changes. Such a method allows such an oscillation state to be appropriately detected.

Also, when the power control signal $D_{PC}$ remains at a constant value for a predetermined time period, the target voltage range setting unit 404 may judge that the rectified voltage $V_{RECT}$ is in the stable state.

[Modification 4]

Description has been made in the embodiment regarding an arrangement in which the rectified voltage $V_{RECT}$ is converted into the digital value $D_{RECT}$, the target voltage range setting unit 404 performs digital signal processing so as to control the upper limit voltage $V_H$ and the lower limit voltage $V_L$, and the electric power control unit 406 performs digital signal processing so as to control the power control signal $D_{PC}$. However, the present invention is not restricted to such an arrangement. That is to say, a part of, or otherwise all of, either of the control operation of the electric power control unit 406 for the power control signal $D_{PC}$ or the control operation of the target voltage range setting unit 404 for the upper limit voltage $V_H$ and the lower limit voltage $V_L$, or otherwise both of them, may be substituted by analog signal processing. For example, voltage comparison may be made using a voltage comparator.

[Modification 5]

Description has been made in the embodiment regarding an arrangement in which the target voltage range REF is expanded so as to suppress the occurrence of oscillation. However, the present invention is not restricted to such an arrangement. Also, the target voltage range setting unit 404 may shift the target voltage range REF in the upper direction or otherwise in the lower direction so as to suppress the occurrence of oscillation. Such an arrangement is capable of providing improved stability of the rectified voltage $V_{RECT}$ as compared with an arrangement in which the target voltage range REF is expanded so as to suppress the occurrence of oscillation.

Also, the target voltage range REF may be shifted in addition to expanded so as to suppress the occurrence of oscillation.

While the preferred embodiments of the present invention have been described using specific terms, such description is for illustrative purposes only, and it is to be understood that changes and variations may be made without departing from the spirit or scope of the appended claims.

What is claimed is:

1. A control circuit that controls a wireless power receiver apparatus, wherein the wireless power receiver apparatus comprises:
   a reception coil;
   a rectifier circuit that rectifies a current that flows through the reception coil; and
   a smoothing capacitor connected to an output of the rectifier circuit,
   wherein the control circuit comprises:
      a target voltage range setting circuit that sets an upper limit voltage and a lower limit voltage that define a target voltage range to be set for a rectified voltage that develops across the smoothing capacitor;
      an electric power control circuit that generates a power control signal for controlling transmission power from the wireless power transmitter apparatus, based on a comparison result obtained by comparing the rectified voltage with each of the upper limit voltage and the lower limit voltage; and
      a modulator that generates a modulated signal by using the power control signal, and that transmits the modulated signal to the wireless power transmitter apparatus via the reception coil,
   and wherein, when an oscillation state is detected in the rectified voltage, the target voltage range setting circuit changes the target voltage range, wherein the power control signal is switchable between a first state indicative of maintaining the transmission power, a second state indicative of increasing the transmission power, and a third state indicative of decreasing the transmission power,
   and wherein, when the rectified voltage becomes lower than the lower limit voltage as a result of the power control signal being set to the third state, the target voltage range setting circuit judges that the rectified voltage is in the oscillation state.

2. The control circuit according to claim 1, wherein, when the rectified voltage transits from a stable state in which the rectified voltage is stabilized within the target voltage range to an unstable state in which the rectified voltage deviates from the target voltage range, the target voltage range setting circuit initializes the target voltage range.

3. The control circuit according to claim 2, wherein the power control signal is switchable between a first state indicative of maintaining the transmission power, a second state indicative of increasing the transmission power, and a third state indicative of decreasing the transmission power,
   and wherein, when the power control signal remains in the first state for a predetermined time period, the target voltage range setting circuit judges that the rectified voltage is in the stable state.

4. The control circuit according to claim 1, wherein, upon detection of the oscillation state in the rectified voltage, the target voltage range setting circuit expands the target voltage range.

5. The control circuit according to claim 1, wherein the target voltage range setting circuit expands the target voltage range by reducing the lower limit voltage.

6. The control circuit according to claim 1, wherein the target voltage range setting circuit expands the target voltage range by raising the upper limit voltage.

7. The control circuit according to claim 1, that conforms to the PMA standard.

8. The control circuit according to claim 1, monolithically integrated on a single semiconductor substrate.

9. A control circuit that controls a wireless power receiver apparatus, wherein the wireless power receiver apparatus comprises:
- a reception coil;
- a rectifier circuit that rectifies a current that flows through the reception coil; and
- a smoothing capacitor connected to an output of the rectifier circuit, wherein the control circuit comprises:
  - a target voltage range setting circuit that sets an upper limit voltage and a lower limit voltage that define a target voltage range to be set for a rectified voltage that develops across the smoothing capacitor;
  - an electric power control circuit that generates a power control signal for controlling transmission power from the wireless power transmitter apparatus, based on a comparison result obtained by comparing the rectified voltage with each of the upper limit voltage and the lower limit voltage; and
  - a modulator that generates a modulated signal by using the power control signal, and that transmits the modulated signal to the wireless power transmitter apparatus via the reception coil,
- and wherein, when an oscillation state is detected in the rectified voltage, the target voltage range setting circuit changes the target voltage range,
- wherein, when a state in which the rectified voltage deviates from the target voltage range continues for a predetermined time period, the target voltage range setting circuit judges that the rectified voltage is in the oscillation state.

10. A control circuit that controls a wireless power receiver apparatus, wherein the wireless power receiver apparatus comprises:
- a reception coil;
- a rectifier circuit that rectifies a current that flows through the reception coil; and
- a smoothing capacitor connected to an output of the rectifier circuit,
- wherein the control circuit comprises:
  - a target voltage range setting circuit that sets an upper limit voltage and a lower limit voltage that define a target voltage range to be set for a rectified voltage that develops across the smoothing capacitor;
  - an electric power control circuit that generates a power control signal for controlling transmission power from the wireless power transmitter apparatus, based on a comparison result obtained by comparing the rectified voltage with each of the upper limit voltage and the lower limit voltage; and
  - a modulator that generates a modulated signal by using the power control signal, and that transmits the modulated signal to the wireless power transmitter apparatus via the reception coil,
- and wherein, when an oscillation state is detected in the rectified voltage, the target voltage range setting circuit changes the target voltage range,
- wherein, when the power control signal changes in a cyclic manner, the target voltage range setting circuit judges that the rectified voltage is in the oscillation state.

11. A control circuit that controls a wireless power receiver apparatus, wherein the wireless power receiver apparatus comprises:
- a reception coil;
- a rectifier circuit that rectifies a current that flows through the reception coil; and
- a smoothing capacitor connected to an output of the rectifier circuit,
- wherein the control circuit comprises:
  - a target voltage range setting circuit that sets an upper limit voltage and a lower limit voltage that define a target voltage range to be set for a rectified voltage that develops across the smoothing capacitor;
  - an electric power control circuit that generates a power control signal for controlling transmission power from the wireless power transmitter apparatus, based on a comparison result obtained by comparing the rectified voltage with each of the upper limit voltage and the lower limit voltage; and
  - a modulator that generates a modulated signal by using the power control signal, and that transmits the modulated signal to the wireless power transmitter apparatus via the reception coil,
- and wherein, when an oscillation state is detected in the rectified voltage, the target voltage range setting circuit changes the target voltage range, wherein, upon detection of the oscillation state in the rectified voltage, the target voltage range setting circuitunit shifts the target voltage range.

12. An electronic device comprising:
a reception coil;
a rectifier circuit that rectifies a current that flows through the reception coil; and
the control circuit according to claim 1.

* * * * *